March 25, 1969
J. LUC
3,434,862
DECORATIVE PROCESS
Filed Feb. 11, 1966
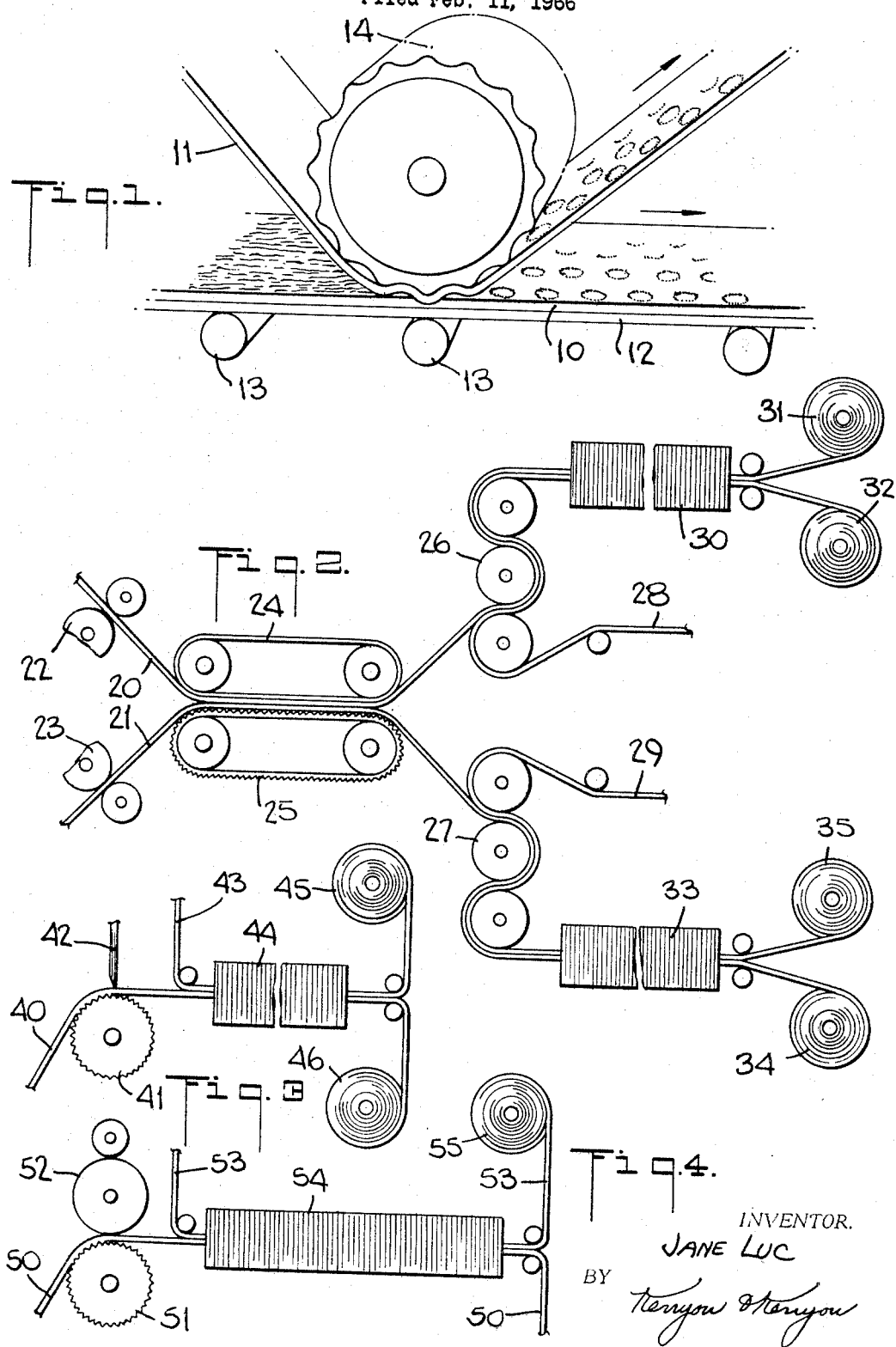
INVENTOR.
JANE LUC
BY
Kenyon & Kenyon
ATTORNEYS

United States Patent Office 3,434,862
Patented Mar. 25, 1969

3,434,862
DECORATIVE PROCESS
Jane Luc, 17 Boulevard Clemenceau,
Strasbourg, Bas-Rhin, France
Continuation-in-part of application Ser. No. 343,069,
Feb. 6, 1964, which is a continuation-in-part, of
application Ser. No. 115,791, June 8, 1961. This
application Feb. 11, 1966, Ser. No. 526, 853
Int. Cl. B44d 5/10; B44c 1/20
U.S. Cl. 117—10                    20 Claims

ABSTRACT OF THE DISCLOSURE

A method for forming a decorative pattern on sheet members which comprises bringing together a pair of sheet members having viscous material therebetween and the viscous material being capable of setting, the surface of at least one of the sheet members having differences in level forming a pattern thereon, the sheet members being brought together under conditions which preserve the differences in level, and separating the pair of sheet members.

---

This application is a continuation-in-part of my copending application Ser. No. 343,069, filed Feb. 6, 1964, which in turn is a continuation-in-part of my application Ser. No. 115,791, filed June 8, 1961 now abandoned.

This invention relates to the art of forming decorative patterns and more particularly to methods for forming decorative patterns on various types of surfaces and in free unsupported films.

An object of this invention is to provide a process for producing a variety of patterns on surfaces of different types.

Yet another object of this invention is to produce patterns within the depth of free films and coatings simultaneously with their formation.

A further object is to provide a process for imparting surface texture to free films and coatings simultaneously with their formation and decoration.

Another object is to provide a process for producing decorative patterns in a various material capable of subsequent setting while the viscous material is in the viscous and unset condition.

A further object of this invention is to produce novel decorative patterns in a settable viscous material by forming the pattern on a supporting surface having a pattern in relief or intaglio.

Another object is to provide a process to produce novel decorative patterns in a settable viscous material by forming the pattern on the surface of a flexible material having as a backing member a surface pattern in relief or intaglio.

A still further object is to provide a process for producing decorative patterns in a settable viscous material cheaply and conveniently without the need for printing rollers and associated equipment.

These and other objects will be apparent from the specification which follows:

According to this invention a decorative pattern is formed in a viscous material capable of subsequent setting by bringing into opposed relationship a pair of surfaces, one of which has a pattern in relief or intaglio, with at least one layer of settable viscous material therebetween, applying pressure to the surfaces, and separating the surfaces while the viscous material is still unset so that the viscous material is partitioned between the two surfaces with the formation of complementary patterns in the portions of the viscous material associated with each surface.

In a preferred embodiment of this invention a decorative pattern is obtained in a viscous material capable of subsequent setting by bringing into opposed relationship a pair of surfaces, at least one of which is flexible and backed by a member having a pattern in relief or intaglio which, when pressure is applied to the whole backing member, will cause pressure to be applied unequally to different portions of the viscous material sandwiched between the two surfaces in opposed relationship, thereby creating a pattern.

The patterns formed according to this invention are determined both by the nature of the member patterned in relief or intaglio which imparts such pattern to the viscous material, and by the partitioning of viscous material between the two opposed surfaces when they are separated. The former generally is the greater influence in determining the patterns produced.

This invention makes it possible to obtain a wide variety of decorative patterns in both color and relief on various surfaces, including woven and unwoven fabrics, paper, paperboard, wood, cork, plastic film and sheet, expanded plastics, metal foil and sheet, asbestos, and plasterboard. Both flexible and rigid materials may be decorated. The patterns are obtained without the use of printing rolls and associated conventional printing equipment, resulting in substantial cost saving. At the same time many effects can be obtained according to this invention which cannot be obtained according to conventional printing techniques. The pattern becomes an integral part of the viscous material after setting, so that the patterns of this invention are much less susceptible to abrasion and wear than conventional printed patterns.

The viscous materials used according to the present invention are materials which are viscous at the time the pattern is formed but capable of subsequent setting. Polymers of ethylenically unsaturated compounds are particularly suitable either as hot melts or as ingredients in the viscous materials of this invention. They are colored in the normal manner by the addition of pigments, fillers and dyes.

Such polymers include polyvinyl chloride, polyvinylidene chloride and copolymers, which may be converted from powder mix compounds, and also used in the form of emulsions, solutions and dispersions.

Types of vinyl dispersion particularly suitable to the practice of this invention are vinyl dispersions such as plastisols, plastigels, organosols and organogels, which are dispersions of vinyl chloride and copolymers thereof in plasticizers, dispersants and diluents, with the addition of stabilizers, colors, fillers and gelling agents as desired, depending upon the properties needed for a specific application. These materials are particularly suitable for coating woven and unwoven fabrics, metals, papers, and for forming a decorative integral skin on an expanded vinyl sheet. These vinyl dispersions behave on the whole like non-Newtonian liquids and can be formulated to suit the required final result. For example, when decorating a paper surface an organosol can be formulated which remains on the surface and does not strike through the paper, and when decorating felt, a high viscosity plastisol can be chosen to avoid its penetration into the bulk of the fabric, leaving sufficient thickness of the viscous material in which the designs can form. In consequence these dispersions are particularly suitable to application of this invention.

Acrylic and modified acrylic plastics may also be used, in solution, as enamels and as aqueous suspensions and emulsions of the polymer. Acrylic polymer emulsions or latexes can be applied to many flexible surfaces such as paper, fabrics, and metal foil where their inherent flexibility prevents cracking, creasing, and weathering.

Vinyl, acrylic and other latexes also possess the property of remaining on the top of an absorbent surface while having good adhesion to it. They are also substantially non-leveling, resistant to water and solvents, fireproof, and heat sealable, making them suitable for numerous applications in the practice of this invention.

Other polymeric thermoplastic materials which may be used either singly or in combination, as hot melts, in solution, dispersion, and emulsion form, or as ingredients in inks, paints and the like, include cellulose acetate, nitrocellulose, shellac and other natural resins, various vinyl, polyester and epoxy compounds. The polyolefins, such as polyethylene, polypropylene and copolymers are particularly suitable as hot melts in the process according to this invention. These hot melts may be used in the form of hot extruded films, in the form of a molding powder which becomes plastic upon the application of heat and/or pressure, and which is formed upon the surfaces which are to be decorated. Viscous material resulting from the softening of a plastic article can also be used as the viscous material in which patterns are formed according to this invention.

Various thermosetting resins, such as phenolformaldehyde, melamine formaldehyde, and the like, may be used in their unset condition.

Other viscous materials which can be used according to this invention, include inks such as flexographic inks having an aniline base, oil base, oil base paints, nitrocellulose and other lacquers, varnishes, and dyes.

Color may be imparted to the viscous material by the incorporation of the usual pigments, dyestuffs and fillers. Either in addition or in lieu of pigment, one may incorporate finely divided particles of mica or of metal and the like, for their decorative effect.

Decoration of the surfaces of flexible materials such as woven and unwoven textiles of natural and synthetic fibers, for example woven cotton fabric, felt, glass cloth, nylon, and materials such as paper and metal foils, is a particularly useful aspect of this invention. Patterns can be formed directly on these surfaces without prior treatment, or the materials may be given a primer coat, or a preliminary coating which may be fused or set and which serves to prevent penetration of the viscous material into the substrate so that it remains in sufficient quantity on the surface for the decorative pattern to be formed therein. The viscous material is also chosen in relation to the surfaces which are to be decorated, so that if the surface is permeable penetration does not exceed that required to permit good adhesion of the coating. Vinyl dispersions and various aqueous emulsions or latexes are an example of this type of viscous material.

A permeable material can be decorated by sandwiching it between two members impermeable to the viscous material, the pattern created by their contact and separation imparting the pattern of the viscous material to the permeable material. A single permeable web can be treated in this manner by sandwiching it between two impermeable webs coated in contrasting colors.

The decorative patterns of this invention can be formed on a variety of surfaces, both rigid and flexible. They can also be formed as free films.

The pattern may be formed directly on a pair of opposed members, one of which has a surface with differences in its level such as a surface in relief or intaglio. The other member preferably has a relatively smooth surface. These opposed members may be rigid or flexible, or one flexible and one rigid. At least one of the two members is advantageously a flexible sheet, for this facilitates separation of the members. Means are provided to apply pressure to the two members while they are in opposed relationship.

The minimum effective variation in the level and height of the patterned surfaces used to create patterns within the viscous material is not usually less than about .025 mm. The pattern may be in much bolder contrast, thus, the depth of variation between the dicerent areas of surface level may be as much as 3 mm. or more.

At least one member having differences in the level of its surface such as a pattern in relief or intaglio may be used indirectly as a backup member to produce patterning in a viscous material formed on its surface or sandwiched between two opposed members, at least one of which is sufficiently thin or flexible to transfer the pattern of the backup member through to the viscous material. When pressure is applied to this assembly the variations in height of the backing member will result in variations of pressure upon the viscous material to create a pattern within it. Such patterned backup members may be rigid or flexible, means being provided to apply sufficient pressure to them to create a pattern in the viscous material. These members may be a plate, roll or endless belt, or a web having variations in the level of its surface, such as patterns achieved by embossing, engraving, molding, stencils, or woven materials, including plastic materials, wire screen or mesh, or materials having a surface pattern of paint or plastic. The effective variation in the level of the patterned backup members used to produce designs in the viscous material, is generally not less than .025 mm. Backup members having only small variations in surface level of the order of about .025 mm. are used only in conjunction with thin and flexible materials to be decorated. In general, the thinner and more flexible the material to be decorated, the smaller differences in level of the backup surface can be. With thicker or less flexible materials bolder variations of level may be used and can be as much as 3 mm. or more. If the surfaces are sufficiently thin or flexible they may temporarily assume the pattern of the backup member and it is advisable to flatten them for example between pinch rolls. In continuous operations, it is more convenient to use backup rolls, or endless belts, over which the flexible webs will continuously pass, as will be more fully explained hereinafter.

Flexible surfaces being decorated may be secured to the respective backup members while the pattern is being formed and removed after the viscous material has been set.

Free films are formed according to this invention by using release surfaces to which the viscous material does not adhere when set. Metal foil and sheet, cloth and paper coated and treated with release agents, such as polytetrafluoroethylene, are examples of such materials. The viscous material is applied to the release surface and the pattern is formed in the usual way. After the viscous material sets, it is stripped from the release surface giving a free film. Backings, including backings coated in a contrasting color can also be applied to these free films before they are set. This is an additional way of producing a decorative coating on a material.

As the first step in the present invention, a viscous material is applied in its unset condition to the surface of at least one member on which the pattern is to be formed. Depending upon the nature of the viscous material and the material to be decorated the viscous material is applied by one of the usual techniques, as for example by spreading, spraying, extrusion, calendaring, doctoring, or by a brush or roller. At least one layer of viscous material is applied between the two opposed surfaces prior to bringing them together. The layer of viscous material may be of one color or may be multicolored, for example by inclusion of several pigments in the viscous material without complete mixing, or by local deposition either at random or in selected areas of the surface, of viscous materials of different tints and colors. It is possible however, to form two layers if desired, for example by applying one layer of viscous material to one surface and another layer of viscous material to the other surface. By using viscous materials having two different colors of sufficient tone contrast a large variety of decorative effects can be obtained which are not obtainable with a single color layer. In particular the pattern of the member carrying a pattern in relief or intaglio will be created clearly in two colors in the viscous material in this manner.

Three or more layers of viscous material may be applied between the two surfaces for unusual decorative effects. This requires the application of at least two layers of viscous material to a single surface. It has been found that this can be done most advantageously by first applying a viscous material of relatively high viscosity directly to the surface, and then applying a second viscous material, preferably of somewhat lower viscosity than the first and of a contrasting color in order to enhance decorative effects. It is better to apply the more viscous material directly to the surface and then apply the less viscous material on top of the more viscous material, rather than applying the less viscous material first.

After one or more layers of viscous material have been formed on at least one of the two surfaces, the two surfaces are brought together and pressure is applied to urge these two surfaces together and thereby squeeze the viscous material sandwiched therebetween.

The areas of preferential pressure resulting from the differences of level of the embossed member will in the case of a single comparatively thin layer of viscous material, tend to thin it in the regions corresponding to the peaks and leave it thicker in the areas corresponding to the valleys. In the case of a viscous material constituted by two or more different color layers, it will result in relative displacement of the viscous material in the different areas, for as one layer is pushed up in the region corresponding to the raised portions of the pattern, the other layer will be pushed down, into the areas corresponding to the valleys. On separation of the two opposed surfaces after they have been brought together under pressure, the viscous material is partitioned between them causing splitting of the different color layers and flow of the viscous material leaving complementary patterns on each surface. Depending upon the viscous material, the material to be decorated and its end use, the control factors such as pressure, the viscosity of the viscous material, the nature of the surfaces in relief or intaglio, the thickness of the layers of viscous material, and the color composition of these layers, can be used to produce the required pattern.

The patterns range from clearly defined orthodox type patterns in several colors, to marbled veined and other effects.

Although patterns can be formed according to this invention using two rigid surfaces, it is advantageous to use at least one flexible surface in forming the patterns. The use of a flexible surface makes it possible to progressively strip said flexible surface from the opposed surface, whether that opposed surface is flexible or rigid. The speed of progressive separation can easily be controlled and surface relief in particular can be influenced by the speed of separation. Relative movement of the opposed surfaces during their contact and separation can also be used to influence the patterns produced.

After separation of the two opposed surfaces with resultant partition of the viscous material, the viscous material is permitted to set. A permanent pattern is produced on setting. Where clear definition of the pattern is required, it is important that the viscous material be substantially non-leveling so that it will hold its shape between the time the surfaces have been separated and the time the viscous material is set. Setting may be allowed to take place by air drying, by chilling, or may be advantageously operated by thermal methods, such as oven drying, fusing, and curing at the normal temperatures required for a given type of viscous material which can reach 250° C. or more.

Where partition in a continuous layer of viscous material of one or more colors, such as a thick film of relatively high viscosity material, produces effects of surface relief and it is desired to obtain patterns with less pronounced relief, or to give a specific finish to the decorative coating or free film, this operation may be combined with the production of the decorative film, coating or product. Thus it is possible to give the products a leather or wood grain, a patterned emboss, a highly polished surface, or other surface, texture or finish. In this way a release surface such as a release paper or other non-adherent sheet or foil material (including metal foil treated with a release agent), having the required surface finish is unrolled with light pressure onto the newly formed patterned viscous material before it is set, and left in place until after setting, chilling or fusing when it is easily stripped from the surface of the solidified coating and can be used again. It is also possible to obtain variations in the final pattern in this manner, for if the release paper is applied to the unset viscous material with somewhat greater pressure, different color areas may be caused to run together giving beautiful halftone effects such as marbled effects. The resultant surfaces are in consequence not only patterned in color but will have the required surface finish. For example a marble type design will have a high gloss finish, and an imitation leather design will have a leather grain of a specific type, or a patent leather finish.

A pattern formed according to this invention may be transferred from the surface on which it is initially formed to another surface. When transfer is contemplated it is preferably to form the pattern initially on a non-adherent surface such as a release paper, metal foil or polytetrafluoroethylene-coated glass cloth. The receiving surface (which can be coated in a contrasting color, uncoated, or wet with a liquid compatible with the viscous material on the release surface) is then brought into proximity with the surface on which the pattern was initially formed, under slight pressure which is preferably insufficient to cause undue mutilation or crushing of the pattern. The non-adherent initial surface may then be stripped off or left in place until after setting of the viscous material. In the latter case the non-adherent material will impart its texture to the finished film or coating.

Transfer of the pattern from a non-adherent surface can also be operated after its setting. For this procedure a pattern is formed in the usual way on either a rigid surface such as a sheet metal treated with a release agent, or on a flexible surface such as a release paper or other release surface which may also serve to impart surface texture to the finished product. The viscous material is then caused to set by fusion or other appropriate means. Another surface, either flexible or rigid, having a coating of viscous material in contrasting color thereon which will serve as a background color to the pattern, is then brought into pressure contact with the first surface having the set viscous material thereon. The two surfaces remain in contact during fusing or setting when the release surface is stripped from the solidified coating. In this way decorative patterns with clear definition can be produced in a coating, which will at the same time be given the required surface finish.

Free films of viscous plastic materials can also be formed in this manner in that the coated receiving surface can comprise a second non-adherent material, both being left in contact until after setting or fusing. The initial pattern may be set or unset for this application.

For the purpose of forming a free film it is necessary to use a viscous material having the required properties such as sufficient structural strength and flexibility to stand as a free film when set.

Either free films or coatings can also be produced by coating a flexible web which can be a non-adherent material while it is backed by a member bearing a pattern in relief or intaglio. If the viscous material is applied by roller or by doctoring, this will already result in the formation of a pattern corresponding to either the hills or the valleys of the patterned backing member. If the material coated in this manner is a non-adherent material it is subsequently brought into contact with a receiving surface coated in a contrasting color, and the two are left in contact until the viscous material is fused or set. The non-adherent surface is now stripped from the solidified coating leaving either a patterned decorative coating on a material or if the receiving surface is also a non-adherent surface it may be stripped to leave a decorated free film.

In all cases where an adherent coating is formed according to this invention it is necessary to choose as the viscous material one which will give a coating having a flexibility at least as great as that of the backing surface to which it is applied. This is necessary in order to prevent cracking of the decorative film upon flexure of the backing surface.

It is possible to etch metal and plastic plates, sheets and foil according to this invention. For example a decorative pattern may be formed in the usual way using the flat metal plate and an embossed metal plate. Upon separation of the two the partitioning of the viscous material will leave portions of the flat metal plate completely uncoated or with a very thin coating of viscous material. Where portions of the plate have been left uncoated, the viscous material is usually allowed to set, and then an etching material, such as aqueous sodium hydroxide or an aqueous acid which does not rapidly attack the coating material, is applied to the metal surface. The uncoated portions of the metal surface will be etched and the coated portions will remain in their unetched state. Where all areas of the metal plate have at least a thin coating thereon, and greater pattern contrast is required, it is possible to remove this thin coating by application of an appropriate organic solvent which will dissolve the coating material slowly. The solvent is allowed to remain on long enough to dissolve the thin portions of the coating, but not long enough to dissolve the thick portions.

Flexible metal foils can also be treated in this manner, by the use of a backing member in relief or intaglio as previously described.

Plastic sheets can also be etched in a similar manner with the appropriate solvents.

This invention may be carried out continuously by using a pair of flexible webs as opposing surfaces on which the coating is formed. Various procedures of this type will be described with reference to the accompanying drawings, in which:

FIG. 1 is a schematic illustration of a process for forming patterns on the surfaces of a pair of flexible webs according to this invention;

FIG. 2 is a schematic illustration of a process for forming patterns on the surfaces of a pair of flexible webs and subsequently contacting this pattern with a non-adhering surface to give a surface finish to the coating;

FIG. 3 is a schematic illustration of a process in which a pattern in relief is first formed on a release surface with the aid of an embossed roller and a doctor knife, and this release member is then contacted with a coated web to form a pattern in both color and relief on the web; and FIG. 4 is a schematic illustration of a process generally similar to that shown in FIG. 3 except that a flat roller is substituted for the doctor knife.

Referring now to FIG. 1, there is illustrated an embodiment in which a pattern is continuously formed on the surfaces of two opposed flexible webs. Flexible webs 10 and 11 are coated with layers of viscous material, preferably of different colors. Web 10 is backed up by an endless belt 12, which in turn is supported by spaced idler rolls 13 and driven by driving rolls (not shown). Flexible webs 10 and 11 are brought together between the nip of an embossed roll 14 above web 11 and an opposed idler roll 13 below web 12, so that the coatings contact each other. The two opposed rolls 13 and 14 apply pressure to the webs 10 and 11 and to the viscous material therebetween. On the far side of the nip of the rolls 13 and 14, the webs 10 and 11 are separated. The embossed surface of roll 14 imparts a pattern in at least two colors to the layers of viscous material adhering to webs 10 and 11. As webs 10 and 11 are separated, the viscous material is partitioned therebetween, which can cause the formation of veined patterns on each of the two webs.

If desired, only one of the webs 10 and 11 need be coated before the webs are brought into contact, or both webs may be coated with viscous material of the same color. While this gives some decorative pattern due to the embossed roll 14 and the partitioning of viscous material between the two webs 10 and 11, the decorative effects thus obtained are less striking than those obtained by the use of viscous material in two contrasting colors.

Referring now to FIG. 2 illustrating another embodiment, a pattern is formed on a pair of surfaces and then modified by contacting the coating with release paper to produce a textured finish. A pair of textile webs 20 and 21 having surface coatings of unset viscous material thereon are brought into contact so that the viscous material layers are sandwiched between the two webs. The coatings are applied by coating rollers 22 and 23 respectively. Pressure is applied by means of a flat endless belt 24 of sheet metal or the like above the upper web 20, and an embossed endless belt 25 below the lower web 21. Embossed belt 25 may be made of sheet metal with an embossed surface, or may be a flexible metal or plastic stencil, an embossed plastic, or other surface having differences in level forming a pattern. This compresses the layers of viscous material between the layers 20 and 21. Upon subsequent separation of textile webs 20 and 21, the viscous material is partitioned, and complementary decorative patterns are formed on each of the two webs. The webs 20 and 21 are thereupon passed through pinch rolls 26 and 27 respectively. Webs 28 and 29 of release paper, which can be either coated or uncoated and have a surface finish are also fed through pinch rolls 26 and 27 respectively, contacting cloth webs 20 and 21 respectively. Cloth web 20 and release paper web 28 pass in contact through oven 30 with a layer of viscous material therebetween. The viscous material is caused to set in the oven. The contact of the cloth web 20 with the release paper 28 under the pressure provided by pinch rolls 26 can cause some flattening of the pattern on the cloth web, and will leave a surface finish on the solidified coating. The cloth web 20 and the release paper web 28 are thereupon wound up on rollers 31 and 32 respectively. The cloth web 21 is handled in a similar manner, contacting release paper web 29 in pinch rolls 27. These two webs are thereupon dried in oven 33 while the respective webs are in contact. The cloth web 27 and release paper web 29 are separated and wound up separately on rolls 34 and 35 respectively, the set pattern adhering to the cloth web 21.

Referring now to FIG. 3, a web of release paper 40 is coated with any of the viscous materials according to this invention by a doctor knife 42. This web passes between an embossing roll 41 and the doctor knife 42. This simultaneously imparts a pattern to the release paper web and levels down the coating of viscous material so that the coating on the release paper 40 conforms in pattern to that of the embossing roll 41. The coated surface of web 40 is then contacted with the coated surface of a second web 43 of cloth, flexible plastic sheet, or the like. Web 43 is coated on one side with a viscous material, which may be similar to the viscous material coating on web 40 but of a different color. The two webs 40 and 43 are then passed into contact through oven 44. This produces a textured two-color coating on web 43. The heat of oven 44 causes setting of the viscous material. Webs 40 and 43 are separated after they have passed through the oven, and the viscous material adheres to web 43, being released from web 40. Coated and decorated web 43 is then wound up on roller 45, while release paper is wound up on roller 46.

Referring now to FIG. 4, there is illustrated a process which is generally similar to that of FIG. 3 except that the web is coated by means of a coating roll rather than a doctor knife. A web of release paper 50 is passed between an embossing roll 51 and an inking or coating roll 52. The inking or coating roll 52 may be used to apply any of the viscous materials according to this invention to the upper surface of web 50. The inking roll 52 and the embossing roll 51 together apply pressure to web 50 sufficient to impart the pattern in relief on embossing roll 51 to the web. The coating material on the upper surface of web 50 covers the hills of the web but not the valleys of web 50. Web 50 is then brought into contact with a second web 53 which is coated with a viscous material on the surface thereof which comes into contact with the coated surface of web 50. The coating on web 53 may be of the same material and approximately the same viscosity as that on web 50, but of a contrasting color. Webs 50 and 53 are then passed in contact with the two layers of viscous material sandwiched therebetween through fusing oven 54. The fusing oven causes the viscous material to be fused and to set. This produces an adherent two-color coating on web 53 comprising a background of the color originally applied to web 53 and a pattern of the color originally applied to web 50. This pattern is similar to that imparted by embossing roll 51 to web 50. The set coating is released from release paper web 50. Webs 50 and 53 are separately wound up on a roller, not shown, and on roller 55 respectively.

Free unsupported films can be produced according to any of the processes described in FIGS. 2, 3 and 4. To produce an unsupported film, webs having a non-adherent surface, which may be imparted by a release coating, are used. Thus for example, webs 20 and 21 in FIG. 2, webs 40 and 43 in FIG. 3, and webs 50 and 53 in FIG. 4 may have release surfaces. In that case the viscous material when set will not adhere to either web, but instead will be formed as a free film.

This invention will now be described in greater detail with reference to the following examples.

Example 1

Materials used:

1 polished flat aluminum plate
1 bath of caustic soda
Silicone polish
1 embossed metal plate One side of the aluminum plate is given a protective coating which is dried. It is then coated with silicone polish and brought into pressure contact with the embossed plate using a pressure of about 4.2 kg./cm². This thins certain areas of the polish on the aluminium plate and causes others to thicken. The two are then separated at a speed of about 10 cm./sec. and the plate placed in a bath of caustic soda for 10 to 20 minutes, when it is removed from the bath, rinsed and the silicone wax removed by a solvent such as toluene.

The caustic soda will have etched the areas of the plate where little or no silicone polish remained, but will have left the areas of thick polish intact. The plate is now decorated with a classical design.

The plate may finally be coated with a clear nitrocellulose lacquer.

Example 2

Materials used:

Medium viscosity (10 to 50,000 cp.) vinyl dispersion (plastisol) in two colors
1 sample woven cotton fabric carrying a preliminary fused vinyl plastisol coating
1 sample woven cotton fabric without a coating
1 embossed metal plate, with depth of emboss about 1 mm.
1 rubber roller The embossed plate is coated with one color plastisol and the coated cloth is given a second coat (on its skim coated side) with a contrasting color plastisol in a layer about 1 mm. thick. The two coated surfaces are now brought into contact and the rubber roller is used to apply pressure in the order of 0.6 to 0.8 kg./cm.². The coated fabric is now separated from the embossed metal plate at a speed of about 5 cm./sec., and is then fused in an oven at 190° C. for from 5 to 10 minutes, when it is decorated in two colors and in relief reflecting the flow of the viscous material under the influence of the metal emboss.

The uncoated cotton fabric is now laid over the pattern formed on the embossed metal plate and the roller used to apply pressure in the order of 0.8 to 1 kg./cm.². The sample is left in contact with the embossed metal plate until after fusion and is then stripped from it. It will bear a fine emboss and two color pattern on it.

Example 3

Materials used:

1 piece of close woven cotton cloth
1 piece of open weave "Teflon" (polytetrafluoroethylene) coated glass cloth
"Tygaflor" (R & J Dick Ltd., Blackburn, Lancs., England Ref: 108 A/03T/00)
2 contrasting colored vinyl "plastisol" dispersions, (30 to 50,000 cp.)
1 embossed metal plate, height of emboss approx. 1 mm.
1 flat metal plate The piece of "Teflon" coated glass cloth is taped to the embossed plate, the textile to the flat plate. Both surfaces are then coated evenly with contrasting colored plastisols in layers between 1 to 2 mm. thick. The coated surfaces are then placed in contact and the assembly passed through the nip of two rollers so that pressure in the order of 1.4 kg./cm.² is applied to the whole. The plates with the materials still attached are then separated at a speed of approximately 5 to 7 cm./sec. The embossed backing plate will have affected viscous flow and the pattern produced within the plastisol coating will reflect that of the embossed plate to a certain degree.

The glass cloth and the textile can either be left on the metal plates duirng the fusing operation or removed from them. Samples are fused in an oven at 205° C. for 1 to 3 minutes. The textile will now carry a decorative coating, whereas the vinyl film is stripped from the coated glass cloth to form an unsupported film.

Example 4

Materials used:

2 samples, size 15 x 15 cms. woven cotton fabric bearing either a primer or a preliminary fused coat of a vinyl dispersion
1 embossed metal plate 17 x 17 cms.
Plastisol (vinyl dispersion) in two shades of brown having an approximate viscosity of between 30 to 50,000 cps.
1 sample embossed release paper size 17 x 17 cms., manufactured by S. D. Warren & Co., Qual. 5588, Emb, Bison 40

One sample of cotton fabric is coated with approximately 1 mm. of the darker brown plastisol, the other with the lighter. They are placed face to face and backed by the embossed plate, and pressure in the order of 1.4 kg./cm.² is applied by a roller. The samples are now removed from the embossed plate and placed on a flat plate and the roller passed over them again with 3 to 4 lbs. pressure to remove any embossing of the cotton fabric, to spread out the design, and to even out the thickness of the coating. On progressive separation at 10 cm./sec. they are decorated with a pattern in color and relief similar to that on the embossed plate modified by that caused by flow of the plastisol on separation of the two surfaces. One sample is now fused in the oven for 1 minute at 350° F. The sample of release paper is now carefully rolled onto the second sample and after fusing in an oven for 2 minutes at 350° F. the release paper is removed leaving a patterned "leathercloth" having a grained leather finish.

This method can also serve to simultaneously coat and decorate other textile materials, either woven or unwoven, and paper. Among the viscous materials which can be used are vinyl dispersions, aqueous based emulsions, paints or inks including flexographic inks having a shellac or other base. Unsupported films can also be produced in this manner by replacing the cotton fabric samples by suitable release surfaces such as paper, metal foils or sheets, from which the film is released when set. Colored viscous resins in the form of hot melts, resinous solutions or dispersions, including vinyl dispersions, solutions of cellulose acetate and polyolefin resins can be used to produce these films.

Example 4A

The same materials are used as in Example 4. The two samples are coated respectively with the darker brown and the lighter brown plastisol and placed face to face and backed by an embossed plate as described in Example 4. The sandwich consisting of the two cotton fabrics and the embossed plate is passed through the nip of a pair of rollers, with the embossed plate in contact with the lower roller. The upper roller has a higher peripheral speed than the lower roller. The feed rates of the two coated fabrics are equal to the peripheral speeds of the respective rollers. As the two fabrics reach the opposite side of the rollers, they are separated, and the upper fabric, which is traveling more rapidly than the lower, has a smearing action upon the surface of the viscous material on the lower roller. This modifies the pattern which would be produced if the rollers were traveling at equal speed. The two samples are then finished, by fusing one sample in an oven and by contacting the second sample with release paper and then fusing it in an oven, as described in Example 4.

Example 5

Materials used:

1 sample release paper Qual. 5588 Seville 40, 1 sample Qual. 5565 Transkote ER/CIS, both manufactured by S. D. Warren & Co., Boston, Mass., size 17 x 17 cms.
2 samples size 15 x 15 cms. woven cotton textile fabric bearing either a primer or a preliminary fused coat of a vinyl dispersion
1 metal stencil
Plastisol in two shades of green, the darker shade being of lower viscosity than the other. (Viscosities between 10 to 50,000 cps.)

One piece of release paper is placed into contact with the metal stencil and coated with a thin layer of the lower viscosity plastisol. The second sample of release paper is brought into contact with it and pressure in the order of 1.4 kg./cm.$^2$ applied. The samples are subsequently separated at a speed of 7.5 cm./sec. and one sample is slightly fused in an oven at 350° F. for 20 seconds.

The two samples of woven cotton fabrics are now coated with approximately 1½ mm. higher viscosity plastisol and the patterned release paper rolled onto them with sufficient pressure to remove any air bubbles. The two samples are now fused in an oven for 3 minutes at 375° F. On removal of the release paper the samples are decorated in color and one has a grained leather, the other a patent leather finish.

This method can be used to transfer patterns which may be either viscous, set or dried to many types of surface whether coated or uncoated, or wet by liquids compatible with the viscous material. Heat, and/or pressure can also be used to obtain the transfer.

Example 6

Materials used:

1 slightly embossed metal plate, 18 x 18 cms.
1 smooth metal plate, 18 x 18 cms.
1 sample cotton fabric, 15 x 15 cms.
An acrylic polymer emulsion in two colors (viscosity 2 mins. Ford cup No. 4 at 20° C.).

One metal plate is coated in one color emulsion, the other in a contrasting color and the two are brought into contact with a pressure of 0.6 kg./cm.$^2$, and with the cotton fabric between them. They are then rapidly separated at a speed of 10 cm./sec. and the cotton fabric removed and dried.

Other textile materials, paper or webs, permeable or partially permeable to the viscous material can be decorated in this manner. The viscous material can be in the form of resinous solutions, dispersions or emulsions, dye pastes, dyes, inks or paints such as an ink containing a flexible nitro-cellulose base.

Example 7

Materials used:

2 low viscosity (10 to 20,000 cp. or less) vinyl dispersion plastisols
1 sheet of embossed aluminum (depth of relief 1 to 2 cms.)
2 sheets of release paper (manufactured by S. D. Warren & Co. Qual. 5588 Emb Gloveskin and Wood Embossed release No. 30)
Vinyl plastisol containing a blowing agent for production of open cell foam
1 sample woven cotton cloth Each sheet of release paper is coated with a contrasting color plastisol and the coated surfaces are then placed in contact with each other against the embossed aluminium sheet and pressure in the order of 0.6 to 0.8 kg./cm.$^2$ is applied from a rubber roller. The sheets are now separated from one edge at a speed of approximately 10 cm./sec. They are decorated with a pattern generally reflecting the surface in relief. Onto this still viscous decorated plastisol coating is sprayed the plastisol containing the blowing agent. Fusion takes place in a hot oven at 195° C. to 240° C. from 10 to 30 minutes. After removal from the oven and allowing to cool, the foam with its decorated integral skin is stripped from the release paper which can be used again.

Example 8

Materials used:

1 piece brown kraft paper
1 sample flexible polyvinyl chloride sheet (1 mm. thick)
1 stencil cut from a sheet of flexible plastic
Acrylic polymer emulsion in two colors
1 rubber roller The kraft paper is coated in one color of acrylic polymer emulsion and the film of polyvinyl chloride in the other. Their coated surfaces are brought into contact against the stencil backing and pressure in the order of 0.6 to 1 kg./cm.$^2$ is applied from a rubber roller. The surfaces are now separated at an approximate speed of 10 cm./sec. The samples can be air dried. Both materials now carry a decorative coat reflecting that of the stencil.

Example 9

Materials used:

1 sample satin Rhodia (acetate satin)
Acrylic polymer emulsion in a single color (viscosity 1 min. Ford cup No. 4 at 20° C.) containing 2 to 5% fine bronze particles
2 webs "Teflon" (polytetrafluoroethylene) coated glass cloth
1 embossed metal plate
1 rubber roller The satin is impregnated in the acrylic polymer emulsion and placed between the two webs of Teflon coated glass cloth backed by the metal emboss. The rubber roller is now used to apply pressure in the order of 1.4 kg./cm.² The upper impermeable Teflon web is now removed and the satin separated from the lower web and left to air dry. Speed of separation is approximately 7 cm./sec. The satin will be decorated in a pattern reflecting that of the emboss in several tones, while the metallic particles will be preferentially situated in certain areas of the pattern.

Two textile webs or more can be decorated in this manner and they can be imbibed with different color inks or dyes, or on the contrary the impermeable webs (such as the Teflon coated glass cloth) can be coated in contrasting colors and the process applied as above, with the textile webs left uncoated until coming into contact with the impermeable webs.

Example 10

Materials used:
1 sample felt base with a preliminary fused coat of a vinyl dispersion (plastisol)
1 sample close woven cotton cloth
Vinyl dispersion (plastisol) in three colors, 1 color with a viscosity of approximately 30,000 cp., and the others in the region of 50,000 cp.
1 sample release paper (S. D. Warren & Co. Qual. 5588 Emb. Bison 40)
1 corrugated metal sheet (corrugations 2 to 3 mm.)
1 sample thick wire mesh in a diagonal pattern (wire 1 to 2 mm. thick)
1 rubber roller The felt based floor covering is first coated with one color high viscosity plastisol on the side already bearing the preliminary fused coat. It is then coated with a second color of the lower viscosity. The cotton fabric is coated with the third color, high viscosity plastisol. The coated surfaces of the material are now placed in contact while backed by the corrugated sheet of metal, the cotton fabric being next to the plate. Pressure in the order of 4 kg./cm.² is applied from the rubber roller. The samples are now removed (before separation) from the metal plate and placed upon the wire mesh in the same position, and pressure of the same order is applied. They are now separated from one edge and it will be found that both bear a design in three colors, each color area roughly representing the areas in which the embossed surfaces were brought into pressure contact, and on which the flow pattern is superimposed. The cotton cloth is now placed in the oven and fused for 5 minutes at a temperature of approximately 350° F. or 195° C.

What is claimed is:

1. A method for forming a decorative pattern on sheet members which comprises:
   (a) bringing together a pair of sheet members having at least two layers of contrastingly colored viscous material therebetween, said viscous material layers being at least partially superimposed on one another and capable of setting, the surface of at least one of said sheet members having differences in level forming a pattern thereon, said sheet members being brought together under conditions which preserve said differences in level; and,
   (b) separating said pair of sheet members before said viscous material is set, said separation causing said viscous materials to be partitioned between said sheet members, thereby froming decorative patterns on the surface of each of said sheet members as said sheet members are separated.

2. A method according to claim 1 in which said viscous material comprises a polymer of at least one ethylenically unsaturated compound.

3. A method according to claim 2 in which said polymer is a vinyl polymer.

4. A method according to claim 2 in which said polymer is an acrylic polymer.

5. A method according to claim 1 in which said pair of sheet members are brought together and separated while moving continuously in the same direction.

6. A method according to claim 1 in which said sheet members are of indefinite length.

7. A method according to claim 6 in which said sheet members are relatively impermeable to said viscous material.

8. The method of claim 1 including the subsequent steps of applying a release coat surface of a second sheet member to the surface of at least one of said pair of first sheet members having said viscous material thereon with sufficient presure to at least partially flaten said viscous material, and separating said first and second sheet members thereby forming a substantially flat decorative pattern on said first sheet member.

9. The method of claim 8 including the step of setting said viscous material after said applying step and prior to said second mentioned separation.

10. The method of claim 9 whereni said applying, setting and separating steps are performed on both of said pair of sheet members.

11. The method of claim 1 including steps of contacting the decorative pattern on one of said sheet members with a surface of a third member and transfering said pattern to said surface of said third member.

12. A method for forming a repeatable decorative pattern on sheet members which comprises:
    (a) bringing together a pair of sheet members between backing members and having viscous material therebetween, and said viscous material being capable of setting, the surface of at least one of said sheet members having differences in level in the form of a repeatable pattern thereon, said sheet members being brought together under conditions which preserve said differences in level; and,
    (b) separating said pair of sheet members before said viscous material is set, said separation causing said viscous materials to be partitioned between said sheet members, thereby forming decorative patterns on the surface of each of said sheet members as said sheet members are separated.

13. A method according to claim 12 in which said material is a vinyl polymer.

14. A method according to claim 12 in which said material is an acrylic polymer.

15. A method for forming a decorative pattern on a sheet member which comprises:
    (a) applying a settable viscous material on a release coat surface of a sheet member, the surface of said sheet member having differences in level at least during said application;
    (b) contacting said viscous material on said release coat sheet member with a second sheet member having thereon a settable viscous material, said contacting being between the sheet member surfaces having said viscous material;
    (c) setting said viscous materials; and
    (d) separating said members, the set viscous materials thereby forming a decorative pattern on said second mentioned sheet member.

16. The method of claim 15 wherein said settable viscous materials are contrastingly colored and contacted so as to be at least partially superimposed on one another.

17. The method of claim 15 wherein said viscous materials are heat set.

18. The method of forming a decorative free film which comprises:
    (a) bringing together a pair of sheet members having a release coat on their surfaces adjacent to each other and having differently colored viscous materials therebetween which are capable of setting, the surface of at least one of said sheet members having differences in level forming a pattern thereon, said sheet members being brought together under conditions which preserve said differences in level;

(b) setting said viscous materials; and (c) separating said pair of sheet members from said viscous materials, thereby forming a decorative free film as said sheet members are separated.

19. The method of forming a decorative pattern on a sheet member which comprises:

(a) bringing together a pair of sheet members one of which having a release coat surface adjacent to the other sheet member surface and having differently colored viscous materials therebetween which are capable of setting, the surface of at least one of said sheet members having differences in level forming a pattern thereon, said sheet members being brought together under conditions which preserve said differences in level;

(b) applying sufficient pressure to said sheet members to at least partially flatten said viscous materials between said sheet members; and (c) separating said pair of sheet members thereby forming a substantially flat decorative pattern on said second mentioned sheet member.

20. A method of claim 19 including the step of setting said viscous material after said applying step and prior to separation step.

References Cited

UNITED STATES PATENTS

| | | | |
|---|---|---|---|
| 288,369 | 11/1883 | Schweizer | 156—12 |
| 1,702,161 | 2/1929 | Huppuch | 117—10 |
| 1,882,714 | 10/1932 | Angier et al. | 117—37 |
| 2,123,646 | 7/1938 | Campbell | 156—234 |
| 2,178,402 | 10/1939 | Miller | 117—10 |
| 2,303,395 | 12/1942 | Schultz et al. | 117—10 X |
| 2,404,073 | 7/1946 | Karfiol et al. | |
| 2,587,594 | 3/1952 | Chavannes et al. | 264—245 XR |
| 2,956,310 | 10/1960 | Roop et al. | 264—54 |
| 3,048,512 | 8/1962 | Nelson | 156—12 XR |

DAVID KLEIN, *Primary Examiner.*

U.S. Cl. X.R.

156—12, 234; 117—45, 37; 156—234; 264—214

UNITED STATES PATENT OFFICE
CERTIFICATE OF CORRECTION

Patent No. 3,434,862   Dated March 25, 1969

Inventor(s) Jane Luc

It is certified that error appears in the above-identified patent and that said Letters Patent are hereby corrected as shown below:

In the Specification
Column 1, line 43 delete "various" and insert therefor --viscous--; Column 1, line 54 delete "pattern" and insert therefor --patterned--. Column 3, line 28 delete "oil base,". Column 4, line 1 delete "dicerent" and insert therefor --different--. Column 6, line 28 delete "preferably" and insert therefor --preferable--. Column 9, lines 45 and 49 delete "aluminum" and insert therefor --aluminium--. Column 10, line 14 delete "an dthe" and insert therefor --and the--; Column 10, line 44 delete "duirng" and insert therefor --during--. Column 11, line 24 after "plastisol and" insert --then--. Column 13, line 52 insert the following: --It will be understood that the Abstract of the Disclosure is included in this specification solely for the purposes of Rule 72(b) of the Rules of Practice United States Patent Office.--

In the Claims
Column 13, line 67 delete "froming" and insert therefor --forming--. Column 14, line 15 delete "flaten" and insert therefor --flatten--; Column 14, line 22 delete "whereni" and insert therefor --wherein--; Column 14, line 27 delete "transfering" and insert therefor--transferring--. Column 16, line 3 after "to" insert --said--.

SEALED
SEP 1 - 1970

(SEAL)
Attest:

Edward M. Fletcher, Jr.
Attesting Officer

WILLIAM E. SCHUYLER, JR.
Commissioner of Patents